(12) United States Patent
Aoki

(10) Patent No.: US 8,520,059 B2
(45) Date of Patent: Aug. 27, 2013

(54) STEREOSCOPIC IMAGE TAKING APPARATUS

(75) Inventor: Takashi Aoki, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 13/636,608

(22) PCT Filed: Dec. 1, 2010

(86) PCT No.: PCT/JP2010/071473
§ 371 (c)(1),
(2), (4) Date: Sep. 21, 2012

(87) PCT Pub. No.: WO2011/118089
PCT Pub. Date: Sep. 29, 2011

(65) Prior Publication Data
US 2013/0010078 A1    Jan. 10, 2013

(30) Foreign Application Priority Data

Mar. 24, 2010  (JP) .................................. 2010-068240

(51) Int. Cl.
*H04N 13/00* (2006.01)
*H04N 13/02* (2006.01)
*H04N 15/00* (2006.01)

(52) U.S. Cl.
USPC ............................................. 348/46; 348/42

(58) Field of Classification Search
USPC ...................................... 348/42, 46; 382/154
See application file for complete search history.

(56) References Cited

U.S. PATENT DOCUMENTS

| 7,596,286 | B2 | 9/2009 | Nose et al. |
| 7,944,481 | B2 | 5/2011 | Kim et al. |
| 2007/0188601 | A1 | 8/2007 | Rohaly et al. |
| 2007/0188769 | A1 | 8/2007 | Rohaly et al. |
| 2008/0013943 | A1 | 1/2008 | Rohaly et al. |
| 2008/0204900 | A1 | 8/2008 | Rohaly et al. |

FOREIGN PATENT DOCUMENTS

| CN | 1592363 A | 3/2005 |
| CN | 101014137 A | 8/2007 |
| JP | 7-35989 A | 2/1995 |
| JP | 2004-207985 A | 7/2004 |
| JP | 2009-168995 A | 7/2009 |
| JP | 2009-527007 A | 7/2009 |
| WO | WO 2007/095307 A1 | 8/2007 |

*Primary Examiner* — Allen Wong
(74) *Attorney, Agent, or Firm* — Birch, Stewart, Kolasch & Birch, LLP

(57) ABSTRACT

A stereoscopic image taking apparatus (10) according to an aspect of the present invention includes a single photographing optical system (12, 14); an imaging device (16) on which pupil-split object images which have passed through a first region and a second region f the photographing optical system, are formed, respectively, the first region and the second region being positioned differently in a predetermined direction, the imaging device which performs photoelectric conversions of an object image which has passed through the first region and an object image which has passed through the second region to output a first image and a second image; and an image processing unit (24) which performs a first image processing to the first image and a second image processing different from the first image processing to the second image and performs the first image processing and the second image processing so as to reduce a difference in image quality between the first image and the second image which have been processed.

11 Claims, 15 Drawing Sheets

(MAIN PIXELS)

(SUB-PIXELS)

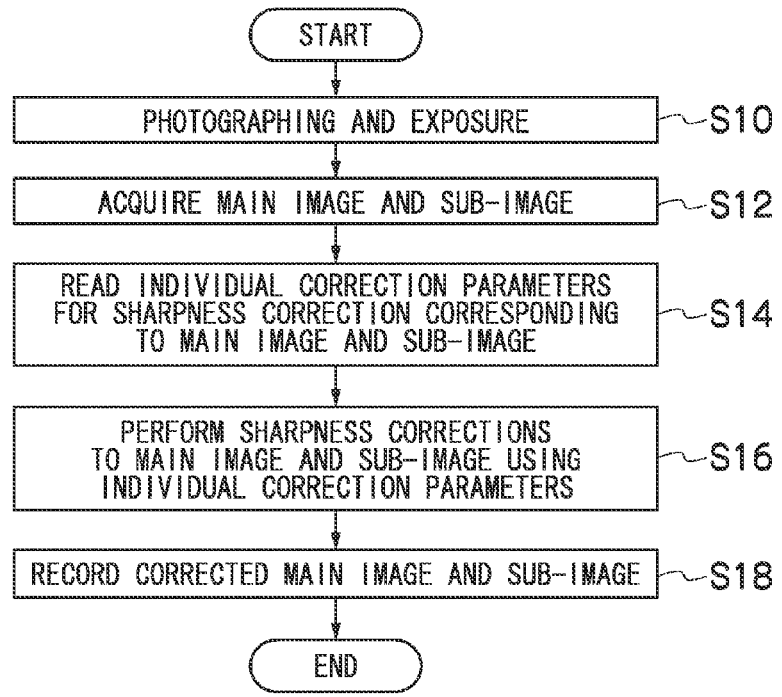
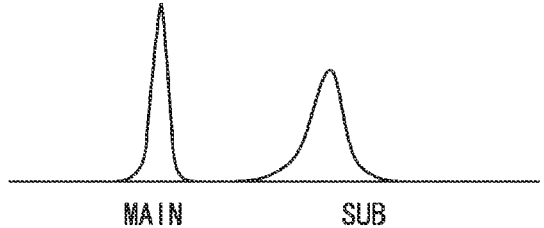
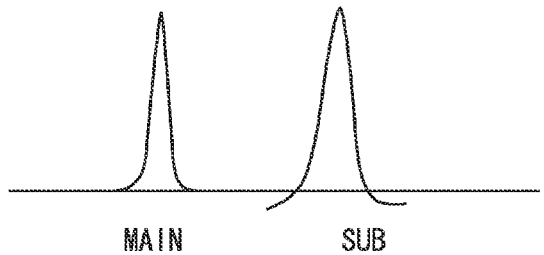

PARALLAX IS NOT INCLUDED

PARALLAX IS INCLUDED

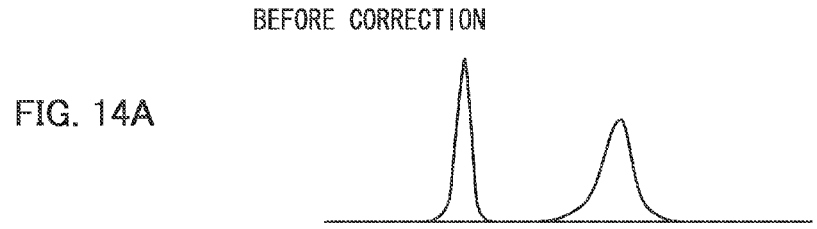
FIG. 14A BEFORE CORRECTION
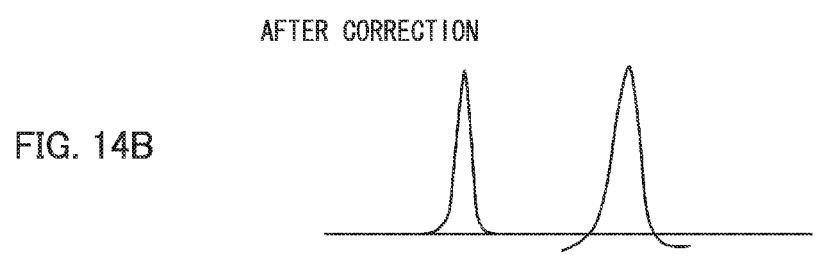
FIG. 14B AFTER CORRECTION
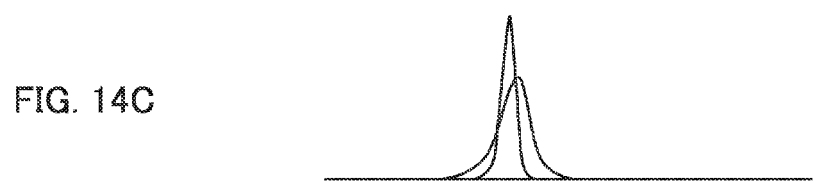
FIG. 14C
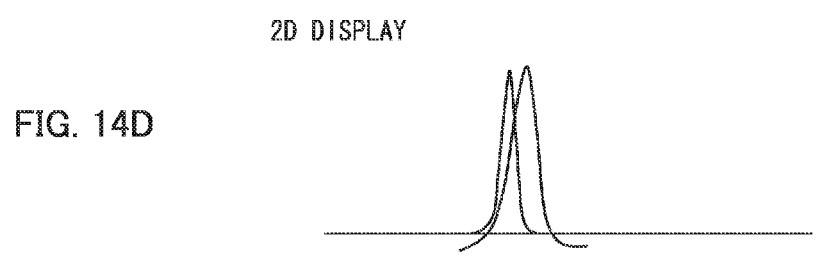
FIG. 14D 2D DISPLAY

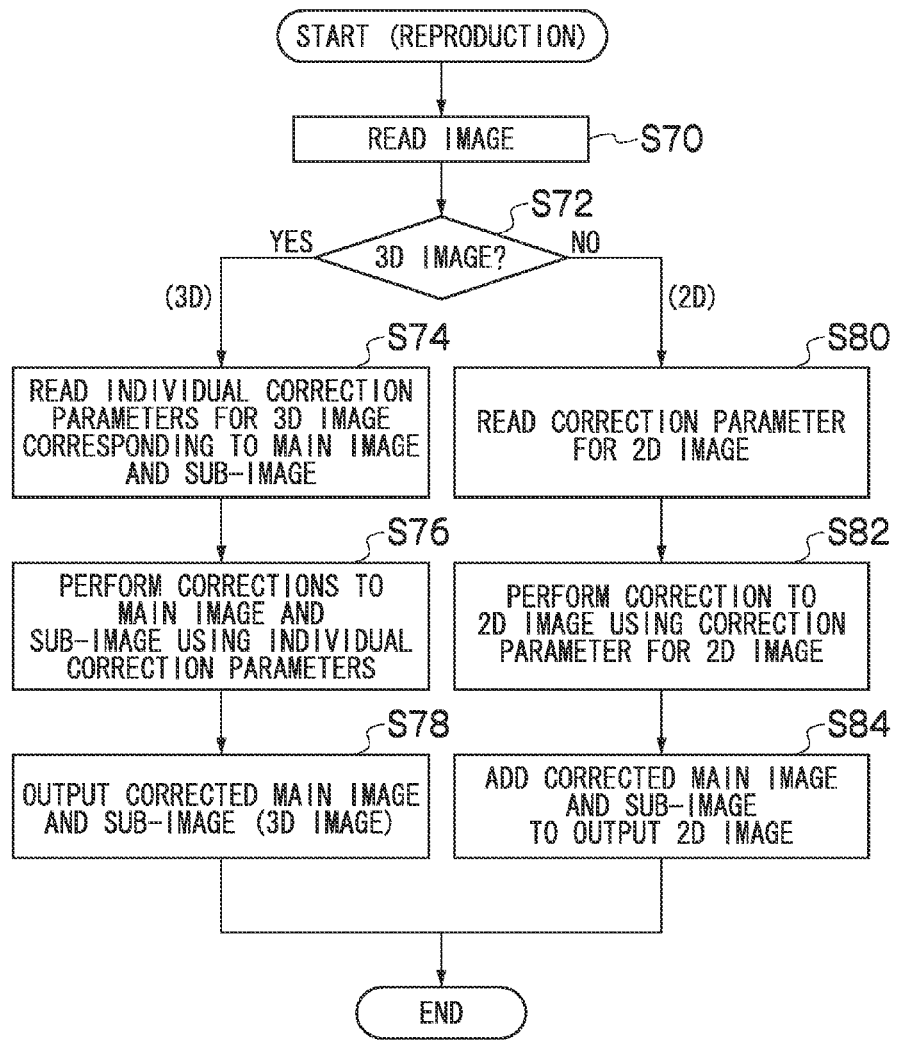

RELATED ART

STEREOSCOPIC IMAGE TAKING APPARATUS

TECHNICAL FIELD

The present invention relates to a stereoscopic image taking apparatus, and in particular to a technique of forming object images which have passed through different regions of an imaging optical system in left and right direction on imaging devices, respectively, to acquire a left viewpoint image and a right viewpoint image.

BACKGROUND ART

Conventionally, a stereoscopic image taking apparatus having an optical system illustrated in FIG. 16 has been known (PTL 1).

The optical system is configured so as to pupil-split, by a mirror 4, object images which have passed through different regions of a main lens 1 and a relay lens 2 in left and right directions to form the object images on imaging devices 7 and 8 via focusing lenses 5 and 6.

Portions (A) to (C) in FIG. 17 are diagrams illustrating separation states of an image to be formed on imaging devices due to such differences as a focal point of a lens in front of an object, focusing (best focus), and a focal point of a lens behind an object. Incidentally, in FIG. 17, the mirror 4 illustrated in FIG. 16 is omitted for comparison of differences in separation due to focus.

As illustrated in Portion (B) in FIG. 17, focused images of pupil-split images are focused on the same position on the imaging device (are coincide with each other), but as illustrated in Portions (A) and (C) in FIG. 17, images obtained by the focal point of a lens in front of an object and the focal point of a lens behind an object are focused on different positions on the imaging device (are separated from each other).

Accordingly, a left viewpoint image and a right viewpoint image (a 3D image) which are different in parallax according to an object distance can be captured by acquiring object images pupil-split in left and right directions via the imaging devices 7 and 8.

In addition, as the conventional art relating to the stereoscopic image taking apparatus, there is one described in PTL 2.

Further, a digital camera which extracts a person-image region from an image to apply different sharpness corrections to the extracted person-image region and the remaining background-image region other than the person-image region, as image processing providing depthwise feeling or stereoscopic feeling has been proposed (PTL3).

CITATION LIST

Patent Literature

PTL 1: National Publication of International Patent Application No. 2009-527007
PTL 2: Japanese Patent Application Laid-Open No. 2009-168995
PTL 3: Japanese Patent Application Laid-Open No. 2004-207985

SUMMARY OF INVENTION

Technical Problem

A left viewpoint image and a right viewpoint image captured by the stereoscopic image taking apparatus described in PTLs 1, 2, or the like correspond to object images pupil-split in left and right directions. Therefore, there is such a problem that due to a difference in optical performance (chromatic aberration, distortion, or the like) between photographing optical systems in left and right directions, blurred aspect or the like becomes unbalanced so that stereoscopic viewing becomes difficult.

On the other hand, the digital camera described in PTL3 is configured so as to apply different sharpness corrections to different regions (respective object distances such that a person-image region and the remaining background image-region other than the person-image region) within one screen to impart different depthwise feelings or stereoscopic feelings to the respective regions. The sharpness corrections in PTL3 are not originally sharpness corrections to be applied to the stereoscopic image composed of a left viewpoint image and a right viewpoint image.

The present invention has been made in view of these circumstances, and an object thereof is to provide a stereoscopic image taking apparatus which can correct unbalance between a left viewpoint image and a right viewpoint image and can capture a stereoscopic image suitable for stereoscopic viewing.

Solution to Problems

In order to achieve the above object, a stereoscopic image according to a first aspect of the present invention includes: a single photographing optical system; an imaging device on which pupil-split object images which have passed through a first region and a second region of the photographing optical system, are formed, respectively, the first region and the second region being positioned differently in a predetermined direction, the imaging device performing photoelectric conversions to an object image which has passed through the first region and an object image which has passed through second region to output a first image and a second image, respectively; and an image processing unit which performs a first image processing to the first image and performs a second image processing different from the first image processing to the second image, the image processing unit performing the first image processing and the second image processing so as to reduce a difference in image quality between the first image and the second image which have been processed.

According the first aspect, by performing different image processing to the first image and the second image acquired by the stereoscopic image taking apparatus, the difference in image quality between both the images can be reduced (correct unbalance including a difference in blur aspect between both the images), which results in a stereoscopic image easily viewable stereoscopically.

A stereoscopic image taking apparatus according to a second aspect of the present invention is configured such that, in the first aspect, the image processing unit performs different sharpness corrections to the first image and the second image, respectively.

A stereoscopic image taking apparatus according to a third aspect of the present invention further includes, in the second aspect, a parallax amount calculating unit which calculates a parallax amount based upon the first image and the second image, wherein the image processing unit reduces a degree of a sharpness correction to images whose calculated parallax amount is large. Since an image falling within the range where the parallax amount thereof is large is blurred, even if large sharpness correction is applied to the image fallen within the range, the image quality of the image cannot be improved, and since a difference in optical characteristic (distortion or the like) becomes noticeable in the blurred range, when the large sharpness correction is applied to the image, the difference in image quality becomes noticeable, which results in undesirable image quality.

A stereoscopic image taking apparatus according to a fourth aspect of the present invention is configured such that, in the first to third aspects, the image processing unit performs different chromatic aberration corrections to the first image and the second image, respectively.

A stereoscopic image taking apparatus according to a fifth aspect of the present invention is configured such that, in the first to fourth aspects, the image processing unit performs different distortion corrections to the first image and the second image, respectively.

A stereoscopic image taking apparatus according to a sixth aspect of the present invention further includes, in the first to fifth aspects, a storage unit which stores a first correction parameter and a second correction parameter used for an image processing of the first image and an image processing of the second image, wherein the image processing unit performs the image processing to the first image and the image processing to the second image based upon the stored first correction parameter and the stored second correction parameter, respectively.

A stereoscopic image taking apparatus according to a seventh aspect of the present invention is configured such that, in the sixth aspect, the photographing optical system is a zoom lens, the first correction parameter and the second correction parameter are stored in the storage unit corresponding to zoom positions of the zoom lens or corresponding to the zoom positions and aperture values, respectively, and the image processing unit reads the first correction parameter and the second correction parameter from the storage unit based upon a zoom position, or the zoom position and an aperture value at a photographing time to perform the image processing to the first image and the image processing to the second image based upon the read first correction parameter and the read second correction parameter, respectively.

Though the optical performances of the imaging optical system in the left and right directions fluctuate according to the zoom position, or the zoom position and the aperture value of the imaging optical system (zoom lens), since correction is performed using the first correction parameter and the second correction parameter stored corresponding to the zoom position, or the zoom position and the aperture value of the zoom lens, more proper image processing can be performed to the first image and the second image.

A stereoscopic image taking apparatus according to an eighth aspect of the present invention further includes, in the first to seventh aspects, a recording unit which records a stereoscopic image composed of the first image and the second image which have been processed by the image processing unit in a recording medium.

A stereoscopic image taking apparatus according to a ninth aspect of the present invention is configured such that, in the first to eighth aspects, the image processing unit performs an image processing different from the first image processing and the second image processing at a photographing time of a flat image obtained by adding the first image and the second image.

That is, at a photographing time of a flat image (a 2D image), image processing further different from the first and second image processing which is performed at the time of photographing the first image and the second image (a 3D image) is performed, so that optimal images can be captured at the photographing times of the 2D image and the 3D image.

A stereoscopic image taking apparatus according to a tenth aspect of the present invention further includes, in the first to seventh aspects, a recording unit which records, in a recording medium, information representing a stereoscopic image and information representing a flat image together with the first image and the second image before being processed by the image processing unit while associating both information with each other, wherein the image processing unit performs the first image processing and the second image processing to the first image and the second image which have been read from the recording medium at an outputting time of the stereoscopic image and performs image processing different from the first image processing and the second image processing at an outputting time of the flat image.

When a 2D image or a 3D image is outputted from the stereoscopic image taking apparatus, optimal processing is performed in response to the 2D image and the 3D image so that outputting can be performed.

A stereoscopic image taking apparatus according to an eleventh aspect of the present invention is configured such that, in the first to tenth aspects, the imaging device includes a first group of pixels and a second group of pixels for photoelectric conversion, the pixels in each group being arranged in a matrix, the first group of pixels being restricted regarding a light receiving direction of luminous flux so as to receive only the object image which has passed through the first region of the photographing optical system and the second group of pixels being restricted regarding a light receiving direction of luminous flux so as to receive only the object image which has passed through the second region of the photographing optical system, and the first image and the second image being capable of being read from the first group of pixels and the second group of pixels.

Thereby, size reduction of an apparatus can be achieved as compared with a stereoscopic image taking apparatus using a plurality of imaging devices.

Advantageous Effects of Invention

According to the present invention, by performing individual image processing to the first and second images (left and right viewpoint images) acquired by the stereoscopic image taking apparatus, respectively, unbalance of the left and right viewpoint images can be corrected, so that a stereoscopic image suitable for stereoscopic viewing can be obtained.

BRIEF DESCRIPTION OF DRAWINGS

FIG. 6 is a flowchart illustrating a photographing action of a stereoscopic image taking apparatus of a first embodiment of the present invention;

FIG. 7A is a diagram illustrating point images before correction;

FIG. 7B is a diagram illustrating point images after correction;

FIG. 14A is a diagram used for explaining an operation of the fifth embodiment of the present invention (before correction);

FIG. 14B is a diagram used for explaining an operation of the fifth embodiment of the present invention (after correction);

FIG. 14C is a diagram used for explaining an operation of the fifth embodiment of the present invention;

FIG. 14D is a diagram used for explaining an operation of the fifth embodiment of the present invention;

FIG. 15 is a flowchart illustrating a reproducing action of a stereoscopic image taking apparatus of a sixth embodiment of the present invention;

DESCRIPTION OF EMBODIMENTS

Embodiments of a stereoscopic image taking apparatus according to the present invention will be described below with reference to the drawings.

<Whole Configuration of Image Taking Apparatus>

Figure 1:
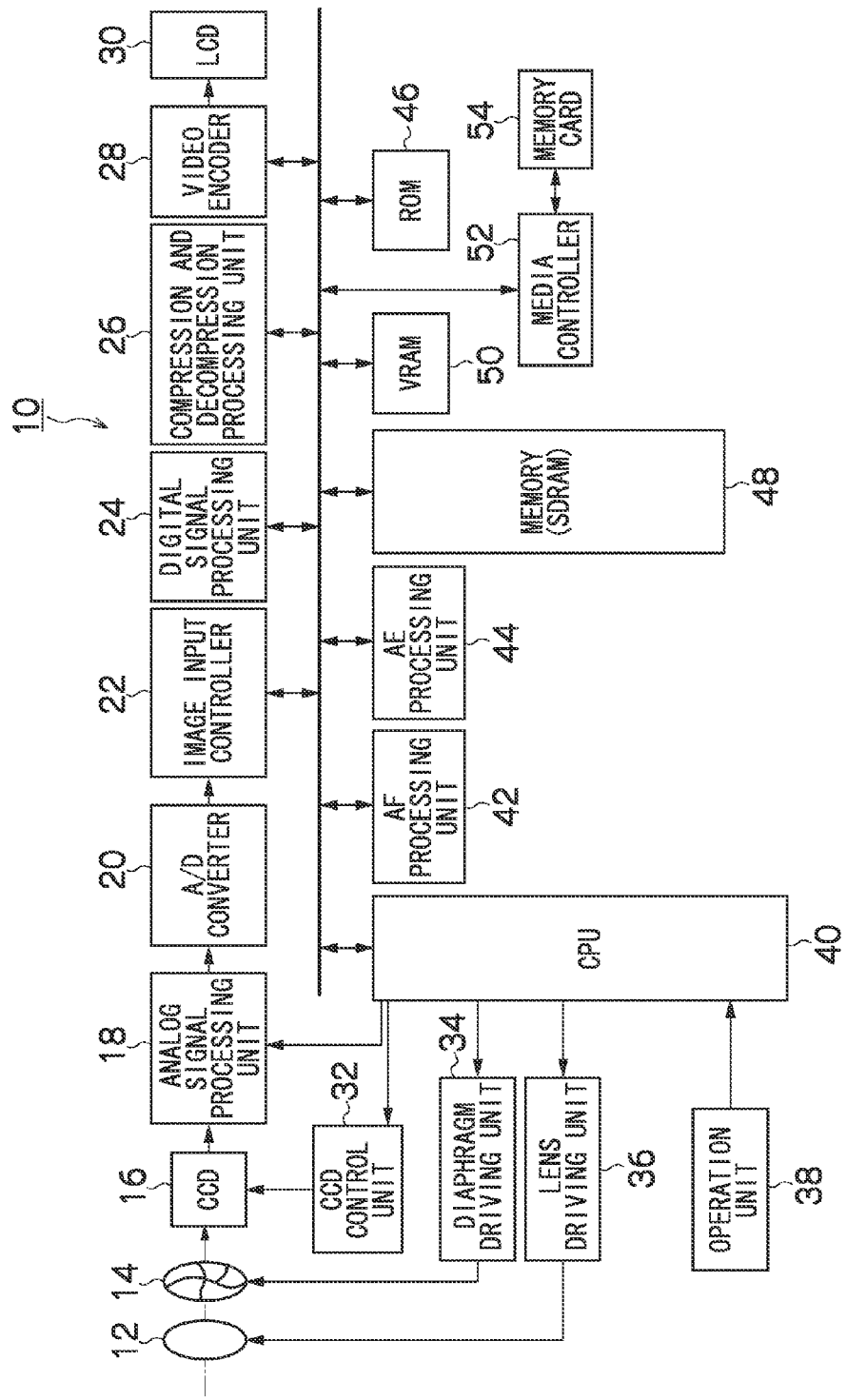
FIG. 1 is a block diagram illustrating an embodiment of a stereoscopic image taking apparatus according to the present invention.

FIG. 1 is a block diagram illustrating an embodiment of a stereoscopic image taking apparatus 10 according to the present invention.

The stereoscopic image taking apparatus 10 records photographed images in a memory card 54, and an operation of the whole apparatus is controlled by a central processing unit (CPU) 40 in an integrating fashion.

The stereoscopic image taking apparatus 10 is provided with an operation unit 38 including a shutter button, a mode dial, a reproducing button, a MENU/OK key, a cross key, a BACK key and the like. A signal from the operation unit 38 is inputted into the CPU 40, so that the CPU 40 controls respective circuits of the stereoscopic image taking apparatus 10 based upon the inputted signal to perform lens driving control, diaphragm driving control, photographing action control, image processing control, recording/reproducing control of image data, display control of a liquid crystal display monitor 30 for stereoscopic display, and the like, for example.

The shutter button is an operation button for inputting an instruction of photographing starting, and is composed of a switch of a two-step stroke type having an S1 switch which is turned ON at a half-pressed state and an S2 switch which is turned ON at a full-pressed state. The mode dial is an operation member for selection which allows selection from a 2D-photographing mode, a 3D-photographing mode, an auto-photographing mode, a manual photographing mode, a scene position such as person, landscape, or night scene, and a moving image mode for photographing a moving image.

The reproducing button is a button for performing switching to a reproducing mode for displaying a still image or a moving image of a stereoscopic image (3D image) or a flat image (2D image) photographed and recorded on the liquid crystal display monitor 30. The MENU/OK key is an operation key having both a function serving as a menu key button for issuing an instruction for displaying a menu on the screen of the liquid crystal display monitor 30 and a function serving as an OK button for issuing an instruction such as decision and execution of selected content. The cross key is an operation unit for inputting instructions of four directions of up, down, left and right directions and functions as a button (an operation member for cursor movement) for selecting an item from a menu screen and instructing selection of each set item from each menu. Further, upper/down keys of the cross key function as a zoom switch at a photographing time or a reproduction zoom key at a reproduction mode, and left/right keys function as a frame advance (forward/backward advance) button at a production mode time. The BACK key is used to erase a desired target such as a selected item or cancel instruction content, or is used to return to the last operation state, or the like.

At the photographing mode time, image light representing an object is focused on a light receiving face of a solid imaging device (hereinafter, called "phase-difference CCD (charge-coupled device)" 16 which is a phase-difference image sensor via a photographing optical system (zoom lens) 12 and a diaphragm 14. The photographing optical system 12 is driven by a lens driving unit 36 controlled by the CPU 40, and is subjected to focus control, zoom control and the like. The diaphragm 14 is composed of, for example, five diaphragm blades, is driven by a diaphragm driving unit 34 controlled by the CPU 40, and is diaphragm-controlled up to five stages, for example, from aperture value F2.8 to F11 on 1 AV base.

Further, the CPU 40 controls the diaphragm 14 via the diaphragm driving unit 34 and performs control of a charge accumulation time (a shutter speed) at the phase-difference CCD 16 or reading of an image signal from the phase-difference CCD 16, or the like via a CCD control unit 32.

<Configuration Example of Phase-Difference CCD>

Figure 2A:
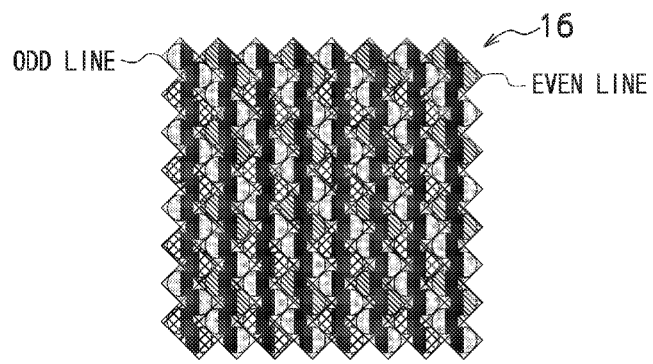
FIG. 2A is a diagram illustrating a configuration example of a phase-difference CCD.
Figure 2B:
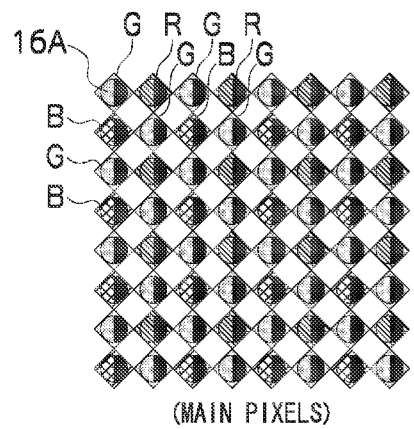
FIG. 2B is a diagram illustrating a configuration example of the phase-difference CCD (main pixels)
Figure 2C:
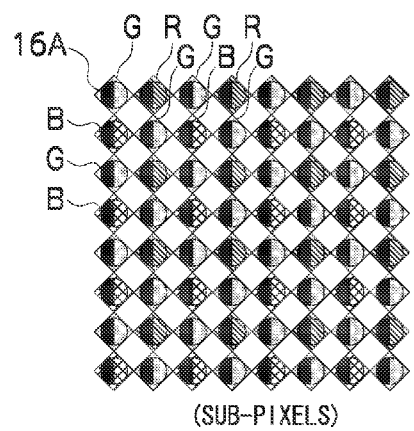
FIG. 2C is a diagram illustrating a configuration example of the phase-difference CCD (sub-pixels)

FIGS. 2A to 2C are diagram illustrating a configuration example of the phase-difference CCD 16.

The phase-difference CCD 16 has pixels of odd lines (main pixels) arranged in a matrix shape and pixels of even lines (sub-pixels) arranged in a matrix shape, and image signals which correspond to two screens and which have been subjected to photoelectric conversions at the main pixels and at the sub-pixels, respectively, can be independently read. Incidentally, such a configuration can be adopted that pixels in all lines of the phase-difference CCD 16 are sequentially read out to be separated into a main image composed of pixels in the odd lines and a sub-image composed o pixels in the even lines.

As illustrated in FIG. 2A to FIG. 2C, regarding pixels having color filters of R (red), G (green), or B (blue), lines of pixel arrangement of GRGR . . . thereof and lines of pixel arrangement of BGBG . . . are alternately provided in the odd lines (1, 3, 5, . . .) of the phase-difference CCD 16, while regarding pixels in the even lines (2, 4, 6, . . .), lines of pixel arrangement of GRGR . . . and lines of pixel arrangement of BGBG . . . are alternately provided like the odd lines, and the pixels in the odd lines are arranged so as to be shifted by ½ pitch relative to the pixels in the even lines in a line direction.

Figure 3:
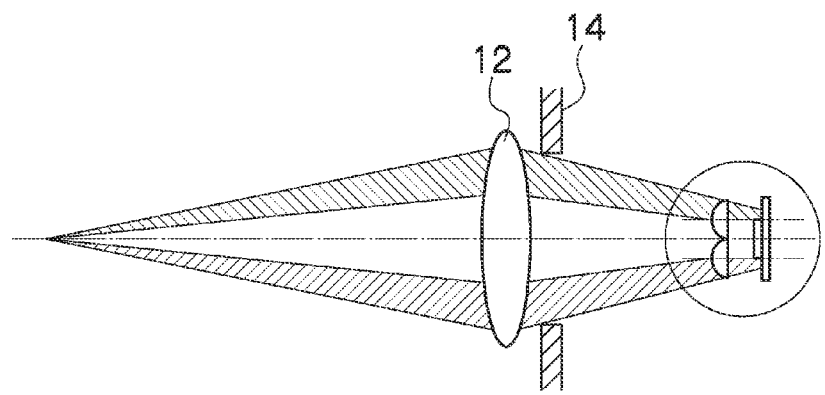
FIG. 3 is a diagram illustrating a photographing optical system and one pixel of the main pixels and one pixel of the sub-pixels of the phase-difference CCD.
Figure 4A:
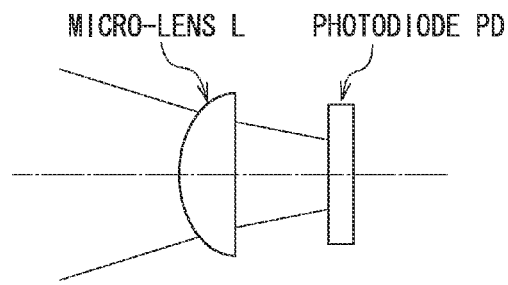
FIG. 4A is an enlarged diagram of a main section illustrated in FIG. 3 (normal pixel)
Figure 4B:
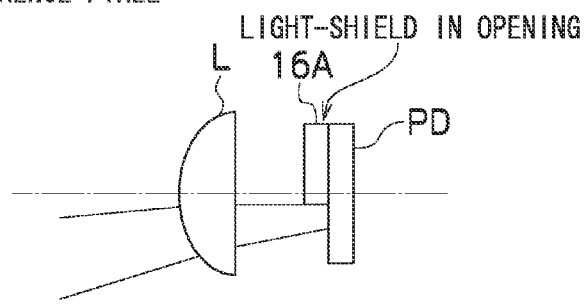
FIG. 4B is an enlarged diagram of a main section illustrated in FIG. 3 (phase-difference pixel)

FIG. 3 is a diagram illustrating the photographing optical system 12, the diaphragm 14, and one of each of the main pixels and the sub-pixels of the phase-difference CCD 16, and FIG. 4A and FIG. 4B are enlarged diagrams of main portions in FIG. 3.

As illustrated in FIG. 4A, luminous flux which passes through an exit pupil is incident on pixels of an ordinary CCD (photodiode PD) via a micro-lens L in an unlimited manner.

On the other hand, light-shielding members 16A are formed on the main pixels and the sub-pixels of the phase-difference CCD 16, right halves or left halves of the light receiving faces of the main pixels and the sub-pixels (photodiode PD) are light-shielded by the light-shielding members 16A. That is, the light-shielding member 16A has a function serving as a pupil-splitting member.

Incidentally, the phase-difference CCD 16 thus configured is configured such that the main pixels and the sub-pixels are different in region (the right half or the left half) where luminous flux is limited by the light-shielding member 16A from each other, but the present invention is not limited to this configuration and such a configuration can be adopted without providing the light-shielding member 16A that the micro-lens L and the photodiode PD are shifted relative to each other in a left or right direction so that luminous flux incident on the photodiode PD is limited according to a direction of the relative shifting, or such a configuration can be adopted that one micro-lens is provided corresponding to two pixels (the main pixel and the sub-pixel) so that luminous flux incident on each pixel is limited.

Returning to FIG. 1, signal charges accumulated in the phase-difference CCD 16 are read as a voltage signal corresponding to the signal charges based upon a reading signal applied from the CCD control unit 32. The voltage signal read from the phase-difference CCD 16 is inputted into an analog signal processing unit 18, where R, G, and B signals for respective pixels are sampled and held and amplified, and the R, G, and B signals are inputted into an A/D converter 20. The A/D converter 20 converts the R, G, and B signals sequentially inputted therein to digital R, G, and B signals to output them to an image input controller 22.

A digital signal processing unit 24 performs predetermined signal processing such as offset processing, gain-control processing including white balance correction and sensitivity correction, gamma correction processing, distortion correction processing, chromatic aberration correction processing, synchronization processing, YC processing, sharpness correction or the like to digital image signals inputted via the image input controller 22. Incidentally, a camera control program, failure information about the phase-difference CCD 16, and various correction parameters or tables used for image processing or the like are stored in a ROM (read-only memory; for example, EEPROM (electrically erasable programmable read-only memory)) 46.

Here, as illustrated in FIG. 2B and FIG. 2C, main image data read from main pixels in the odd lines of the phase-difference CCD 16 is processed as left viewpoint image data, while sub-image data read from sub-pixels in the even lines is processed as right viewpoint image data.

The left viewpoint image data and the right viewpoint image data (3D image data) which have been processed in the digital signal processing unit 24 are inputted into a VRAM (video random access memory) 50. An A region and a B region are included in the VRAM 50, each region storing 3D image data representing 3D image corresponding to one frame therein. The 3D image data representing 3D image corresponding to one frame are alternately rewritten between the A region and the B region. The written 3D image data is read from a region other than a region where the 3D image data has been rewritten of the A region and the B region of the VRAM 50. The 3D image data read from the VRAM 50 is encoded in a video encoder 28 and outputted to the liquid crystal display monitor 30 for stereoscopic display provided on a rear face of the camera, so that an object image of 3D is displayed on the display screen of the liquid crystal display monitor 30.

The liquid crystal display monitor 30 is a stereoscopic display device which can display stereoscopic images (a left viewpoint image and a right viewpoint image) as directional images having predetermined directionalities, respectively, by a parallax barrier, but the liquid crystal display monitor 30 is not limited to this, and such a configuration can be adopted that a left viewpoint image and a right viewpoint image can be individually viewed by wearing dedicated eyeglasses such as polarized eyeglasses or liquid crystal shutter eyeglasses.

Further, when the shutter button of the operation unit 38 is pressed down to the first step (half-pressing), the phase-difference CCD 16 starts AF (automatic focus) action and AE (automatic exposure) action and performs such control that the focus lens in the photographing optical system 12 reaches a focusing position via the lens driving unit 36. Further, image data outputted from the A/D converter 20 at a half-pressing time of the shutter button is taken into an AE detecting unit 44.

In the AE detecting unit 44, G signals on the whole screen are integrated or G signals positioned on a central portion of the screen and signals positioned on a surrounding portion of the screen surrounding the central portion, the former signals and the latter signals being weighed differently, are integrated so that the integrated value is outputted to the CPU 40. The CPU 40 calculates a luminance (photographing Ev value) of the object based upon the integrated value inputted from the AE detecting unit 44, and determines the aperture value of the diaphragm 14 and the electronic shutter (shutter speed) of the phase-difference CCD 16 according to a predetermined program diagram, thereby controlling the diaphragm 14 via the diaphragm driving unit 34 based upon the determined aperture value and simultaneously controlling the charge accumulation time in the phase-difference CCD 16 via the CCD control unit 32 based upon the determined shutter speed.

The AF processing unit 42 is a part for performing contrast AF processing and phase-difference AF processing. When performing the contrast AF processing, the AF processing unit 42 extracts high-frequency components of at least one image data, positioned within a predetermined focus region, of left viewpoint image data and right viewpoint image data and calculates an AF evaluation value representing a focusing state by integrating the high-frequency components. The AF control is performed by controlling the focus lens within the photographing optical system 12 such that the AF evaluation value becomes the local maximum. Further, performing the phase-difference AF processing, the AF processing unit 42 detects a phase difference in image data between image data corresponding to the main pixels and image data corresponding to the sub-pixels, positioned within a predetermined focus region, of left viewpoint image data and right viewpoint image data to obtain a defocus amount based upon the information indicating the phase difference. The AF control is performed by controlling the focus lens within the photographing optical system 12 such that the defocus amount becomes zero.

After the AE action and the AF action are terminated, when the shutter button is pressed down to the second step (fully pressing), image data corresponding to two frames of the left viewpoint image (main image) and the right viewpoint image (sub-image) corresponding to the main pixels and the sub-pixels outputted from the A/D converter 20 in response to the pressing-down is inputted from the image input controller 22 to a memory (SDRAM: synchronous dynamic random access memory) 48 to be temporarily stored therein.

The image data corresponding to two frames temporarily stored in the memory 48 is properly read by the digital signal processing unit 24 and predetermined signal processing of the image data including generation processing (YC processing) of luminance data and color difference data is performed therein. The image data (YC data) which has been subjected to the YC processing is stored in the memory 48 again. Subsequently, the YC data corresponding to two frames is outputted to a compression and decompression processing unit 26, respectively, and is subjected to predetermined compression processing such as JPEG (Joint Photographic Experts Group) to be then stored in the memory 48 again.

A multi-picture file (MP file: a file having a form of a plurality of images connected) is generated from the YC data (compressed data) corresponding to two frames and stored in the memory 48, and the MP file is read by a media controller 52 to be recorded in a memory card 54.

<First Embodiment>

Next, signal processing (image processing) to image data of the main pixels and the sub-pixels read from the phase-difference CCD 16, which is performed in the digital signal processing unit 24 will be described.

Figure 5A:
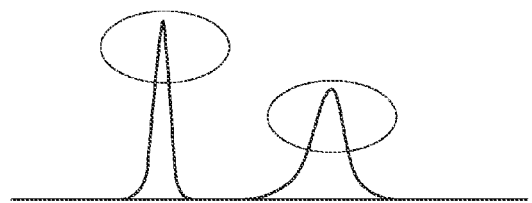
FIG. 5A is a diagram illustrating one example of point images obtained from the main pixels and sub-pixels of the phase-difference CCD (corresponding to a photographing optical system illustrated in FIG. 5D)
Figure 5B:
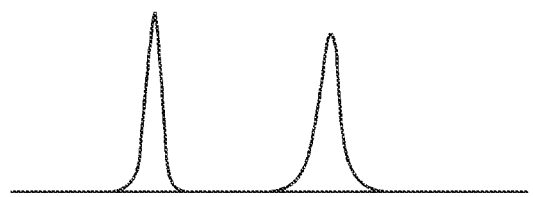
FIG. 5B is a diagram illustrating one example of point images obtained from the main pixels and sub-pixels of the phase-difference CCD (corresponding to a photographing optical system illustrated in FIG. 5E)
Figure 5C:
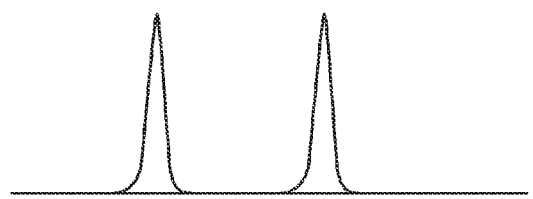
FIG. 5C is a diagram illustrating one example of point images obtained from the main pixels and sub-pixels of the phase-difference CCD (corresponding to a photographing optical system illustrated in FIG. 5F)
Figure 5D:
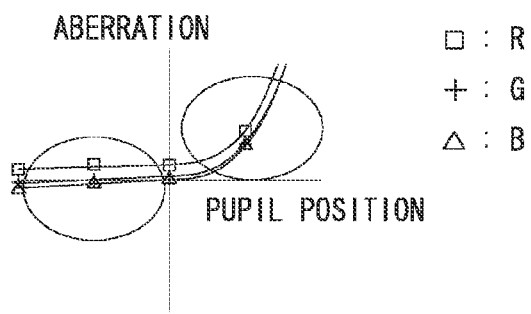
FIG. 5D is a diagram illustrating a first example of lens aberration of the photographing optical system.
Figure 5E:
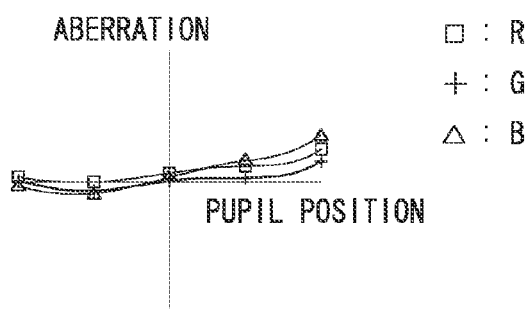
FIG. 5E is a diagram illustrating a second example of lens aberration of the photographing optical system.
Figure 5F:
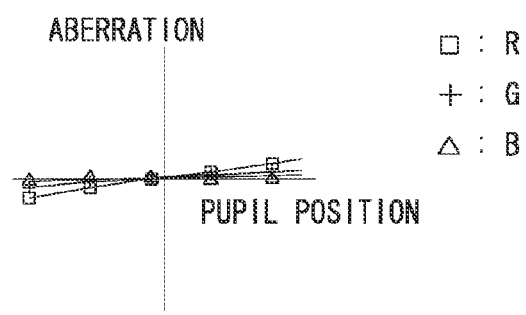
FIG. 5F is a diagram illustrating a third example of lens aberration of the photographing optical system.

FIG. 5D to FIG. 5F are graphs illustrating one example of aberration of the photographing optical system, respectively. A horizontal axis represents a pupil position, and a vertical axis represents aberration.

The photographing optical system includes aberrations such as spherical aberration, chromatic aberration, comatic aberration, astigmatism, or field curvature. In the stereoscopic image taking apparatus 10, since image data of the main pixels and the sub-pixels is acquired from object images pupil-split in a left direction and a right direction (object images which pass through different regions of the photographing optical system in the left direction and the right direction), aberrations of the photographing optical system in the left direction and the right direction affect image quality of image data of the main pixels and the sub-pixels.

FIG. 5A to FIG. 5C illustrate one examples of point images of the main pixels and the sub-pixels obtained from the stereoscopic image taking apparatuses having the photographing optical systems illustrated in FIG. 5D to FIG. 5F, respectively.

As illustrated in FIG. 5C, in the case of the photographing optical system having the aberration as illustrated in FIG. 5F, the aberration does not affect peaks and slopes of the point images of the main pixels and the sub-pixels, but in the case of the photographing optical system having the aberration as illustrated in FIG. 5D, the aberration largely affects the peaks and PSF (point-spread-function) of the point images of the main pixels and the sub-pixels.

Then, in the case of the photographing optical system having the aberration as illustrated in FIG. 5D, the main image and the sub-image becomes unbalanced in a surrounding area within the photographing angle of field, which results in difficulty in stereoscopic viewing.

Therefore, in the first embodiment, aberration of the photographing optical system 12 or the like is examined before shipment of a product, and individual correction parameters for sharpness correction to image data of the main pixels and image data of the sub-pixels are prepared to be written in the ROM 46.

When the digital signal processing unit 24 performs sharpness corrections to the image data of the main pixels and the image data of the sub-pixels, it reads the individual correction parameters from the ROM 46 to perform corrections to the image data of the main pixels and the image data of the sub-pixels, thereby adjusting the balance between both the images.

Incidentally, in the sharpness correction, for example, a convolution filter having a predetermined size (3×3, 5×5) can be used, and intensity of the sharpness correction can be adjusted by setting a filter coefficient (correction parameter) properly. Further, by applying correction parameters to respective regions within the photographing angle of field, sharpness corrections to the main image and the sub-image can be performed to the respective regions.

FIG. 6 is a flowchart illustrating a photographing action of the stereoscopic image taking apparatus 10 of the first embodiment of the present invention.

The CPU 40 performs exposure for main photographing when the shutter button is fully pressed (step S10).

When the photographing exposure is performed, the main image and the sub-image are read from the phase-difference CCD 16, respectively, to be once stored in the memory 48 (step S12). The main image and the sub-image stored in the memory 48 are subjected to various signal processing such as white balance processing, gamma correction processing, synchronization processing, and YC processing by the digital signal processing unit 24, but these processing is omitted in FIG. 6.

Subsequently, the digital signal processing unit 24 reads the individual correction parameters for sharpness correction corresponding to the main image and the sub-image from the ROM 46 (step S14). Then, sharpness corrections are performed to the main image and the sub-image using the individual correction parameters (step S16). Incidentally, the sharpness correction is ordinarily performed to the Y signal (luminance signal) produced by the YC processing.

The main image and the sub-image corrected in the above manner are subjected to sharpness corrections using the individual correction parameters, so that as illustrated in FIG. 7B, peaks of point images corresponding to the main image and the sub-image can be made coincide with each other more excellently than the case illustrated in FIG. 7A (before correction), so that balance between the left and right viewpoint images is improved.

The main image and the sub-image (YC signals) subjected to the image processing in the above manner are compressed and stored in the MP file, respectively, and the MP file is recorded in the memory card 54 via the media controller 52 (step S18).

<Second Embodiment>

Figure 8:
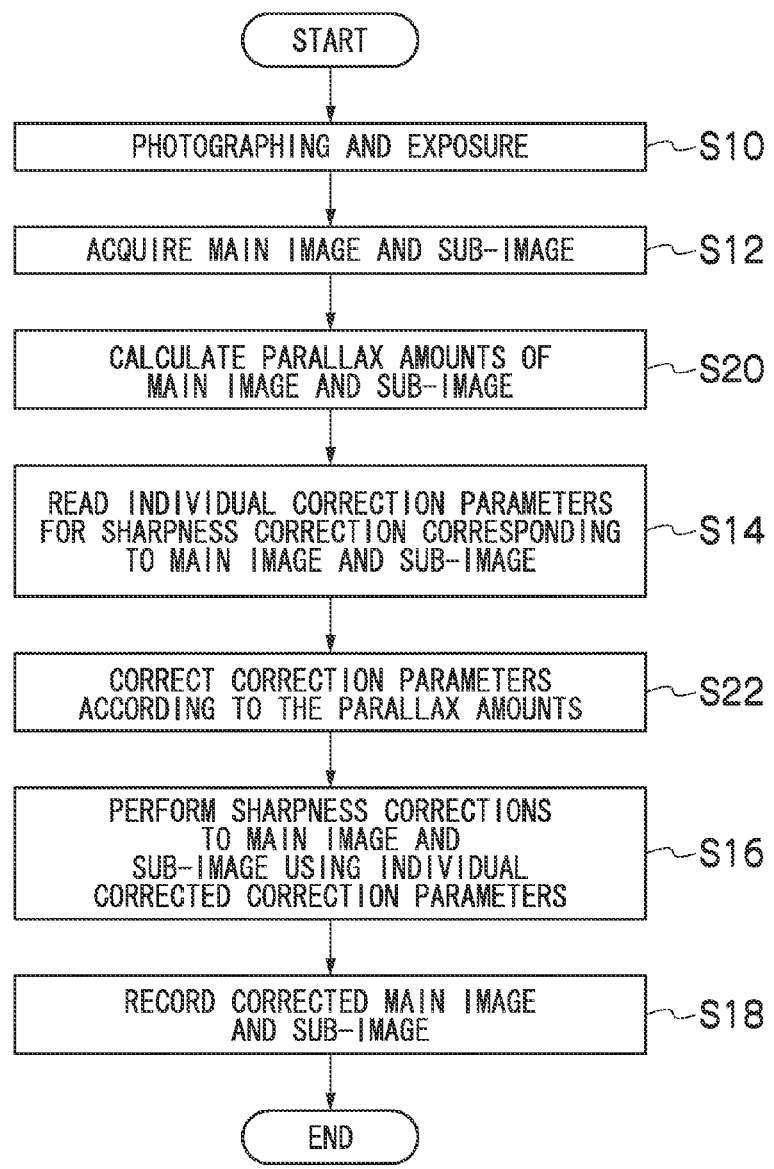
FIG. 8 is a flowchart illustrating a photographing action of a stereoscopic image taking apparatus of a second embodiment of the present invention.

FIG. 8 is a flowchart illustrating a photographing action of a stereoscopic image taking apparatus 10 of a second embodiment of the present invention. Incidentally, portions common with those in the first embodiment illustrated in FIG. 6 are attached with same step numbers and detailed explanation thereof will be omitted.

As illustrated in FIG. 8, the second embodiment is different from the first embodiment in such a point that processing at step S20 and processing at step S22 are added to the second embodiment.

At step S20, a parallax amount at corresponding points of the main image and the sub-image acquired from step S12 is calculated.

In the calculation of the parallax amount, based upon one (for example, the main image) of the images, pixels of the other image (the sub-image) corresponding to those the one image are obtained. As a method of obtaining the corresponding pixels, for example, there is a block matching method. Regarding all the pixels on the main image, parallax amounts thereof to the corresponding pixels on the sub-image are obtained, so that a parallax map representing parallaxes corresponding to one frame image is prepared.

At step S22, a region with a large parallax amount (a largely blurred region) is obtained from the parallax map prepared at step S20 to correct correction parameter corresponding to the region with a larger parallax amount so as to make sharpness correction weak.

Figure 9A:
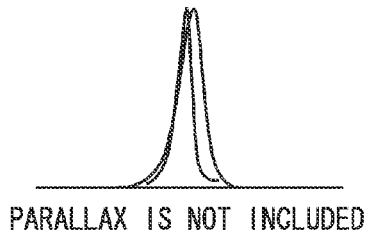
FIG. 9A is a diagram illustrating a difference of point images due to presence/absence of parallax (including no parallax)
Figure 9B:
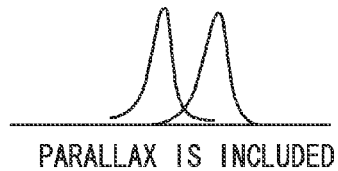
FIG. 9B is a diagram illustrating a difference of point images due to presence/absence of parallax (including parallax)

By performing the sharpness corrections of the main image and the sub-image using the correction parameter corrected in response to the parallax amount as described above, sharpness correction can be strongly applied to a region which does not include parallax (or a region with reduced parallax), as illustrated in FIG. 9A, while sharpness correction can be weakly applied to the largely blurred region (blurred region), as illustrated in FIG. 9B.

<Third Embodiment>

Figure 10:
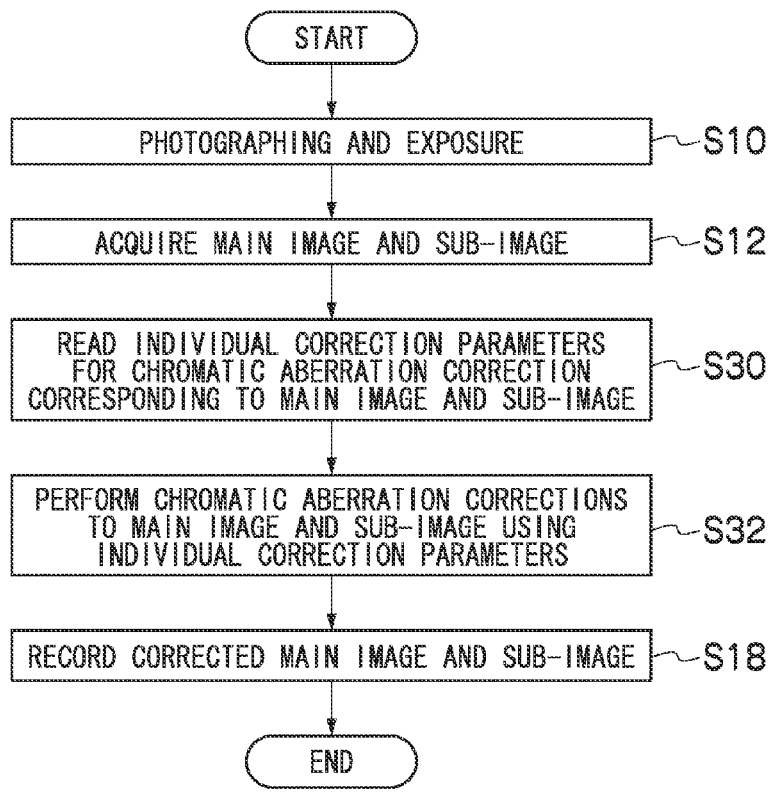
FIG. 10 is a flowchart illustrating a photographing action of a stereoscopic image taking apparatus of a third embodiment of the present invention.

FIG. 10 is a flowchart illustrating a photographing action of a stereoscopic image taking apparatus 10 of a third embodiment of the present invention. Incidentally, portions common with those in the first embodiment illustrated in FIG. 6 are attached with same step numbers and detailed explanation thereof will be omitted.

As illustrated in FIG. 10, the third embodiment is different from the first embodiment in such a point that the former performs processing at step S30 and processing at step S32 instead of step S14 and step S16.

At step S30, individual correction parameters for chromatic aberration correction corresponding to the main image and the sub-image are read from the ROM 46.

At step S32, chromatic aberration corrections are performed to the R, G, B signals of the main image and the R, G, B signals of the sub-image using correction parameters corresponding to respective colors read and corresponding to the respective main image and sub-image.

Figure 11:
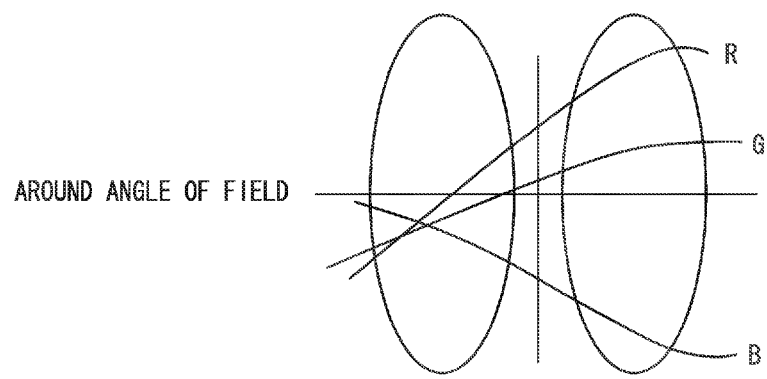
FIG. 11 is a diagram illustrating one example of a difference in chromatic aberration between a main image and a sub-image around angle of field.

FIG. 11 illustrates one example of a difference in chromatic aberration between the main image and the sub-image around the angles of field thereof.

According to the third embodiment, the chromatic aberrations of the main image and the sub-image around the angles of field can be corrected individually, so that a main image and a sub-image which do not have color deviations can be obtained.

<Fourth Embodiment>

Figure 12:
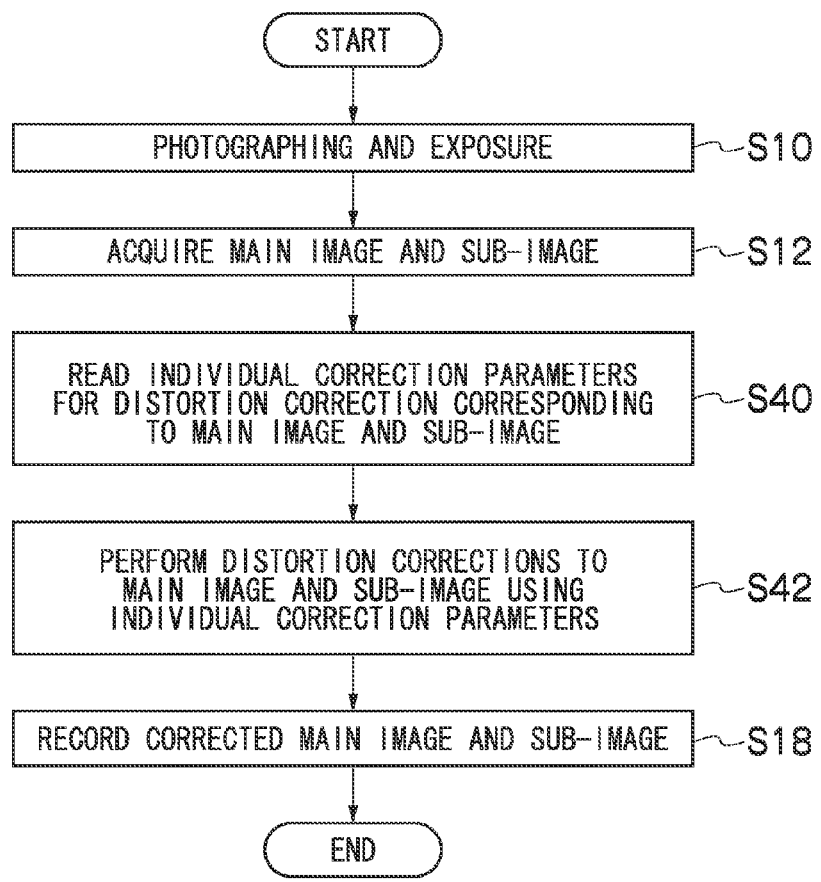
FIG. 12 is a flowchart illustrating a photographing action of a stereoscopic image taking apparatus of a fourth embodiment of the present invention.

FIG. 12 is a flowchart illustrating a photographing action of a stereoscopic image taking apparatus 10 of a fourth embodiment of the present invention. Incidentally, portions common with those in the first embodiment illustrated in FIG. 6 are attached with same step numbers and detailed explanation thereof will be omitted.

As illustrated in FIG. 12, the third embodiment is different from the first embodiment in such a point that the former performs processing at step S40 and processing at step S42 instead of step S14 and step S16 illustrated in FIG. 6.

At step S40, individual correction parameters for distortion (strain aberration) correction corresponding to the main image and the sub-image are read from the ROM 46.

At step S42, distortion corrections are performed to the main image and the sub-image using the read individual correction parameters.

Thereby, even if the distortions of the photographing optical system 12 in the left and right directions are asymmetric to each other, a main image and a sub-image which are not affected by the distortions can be obtained.

<Fifth Embodiment>

Figure 13:
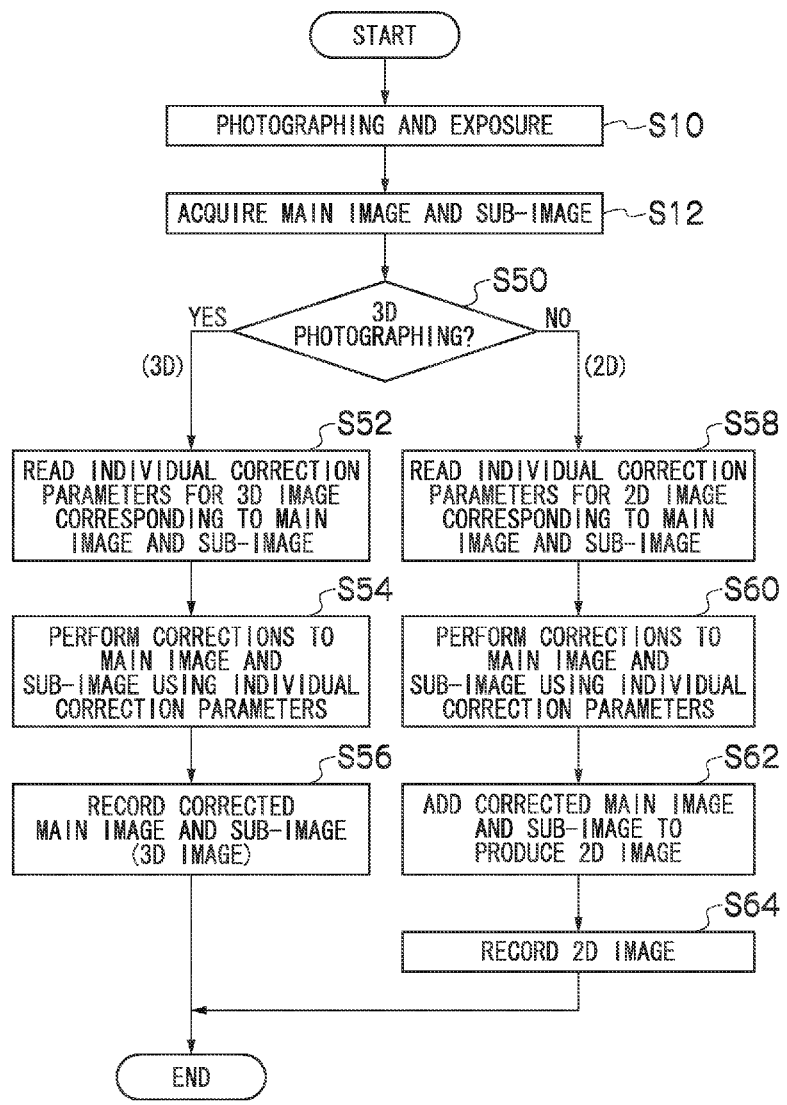
FIG. 13 is a flowchart illustrating a photographing action of a stereoscopic image taking apparatus of a fifth embodiment of the present invention.

FIG. 13 is a flowchart illustrating a photographing action of a stereoscopic image taking apparatus 10 of a fifth embodiment of the present invention. Incidentally, portions common with those in the first embodiment illustrated in FIG. 6 are attached with same step numbers and detailed explanation thereof will be omitted.

The fifth embodiment illustrated in FIG. 13 is configured to perform switching between image processing at a photographing time of a 2D image and image processing at a photographing time of a 3D image.

The stereoscopic image taking apparatus 10 performs different processing to the case where a 2D photographing mode has been selected and the case where a 3D photographing mode has been selected, in the following manner. Incidentally, a processing is similarly performed until the main image and the sub-image are read from the phase-difference CCD 16, namely, up to step S10 and S12.

At step S50, whether or not the 3D photographing mode has been selected (the 2D photographing mode) is determined, and when the 3D photographing mode has been selected (in the case of YES), the processing proceeds to step S52, while when the 2D photographing mode has been selected (in the case of NO), the processing proceeds to step S58.

In the processing to the main image and the sub-image during the 3D photographing mode, individual correction parameters are read from the ROM 46 corresponding to the main image and the sub-image (step S52) and image processing of the main image and image processing of the sub-image are performed using the read individual correction parameters (step S54), as explained in the above-described first embodiment to fourth embodiment. Then, the corrected main image and sub-image are stored in the MP file to be recorded on the memory card 54 (step S56).

Thereby, balance between the main image and the sub-image can be achieved regardless of a difference in optical characteristic of the photographing optical system 12 between the left and right directions.

On the other hand, in the case of the 2D photographing mode, individual correction parameters for 2D image corresponding to the main image and the sub-image and different from the correction parameters for 3D image are read from the ROM 46 (step S58). Incidentally, the characteristics of the correction parameters for 2D image will be described later.

Then, the main image and the sub-image are corrected using the read individual correction parameters (step S60), and a 2D image is produced by adding pixels of the corrected main image and sub-image corresponding to each other (step S62).

The produced 2D image is stored in an image file (Exif file) for a digital camera to be recorded on the memory card 54 (step S64).

As illustrated in FIG. 14A (before correction) and FIG. 14B (after correction), the main image and the sub-image are corrected so that the point images therein are equal to each other at the photographing time of the 3D image.

On the other hand, by adding the main image and the sub-image which have been corrected for a 3D image illustrated in FIG. 14B, a picture such as two-line blur is obtained, as illustrated in FIG. 14D.

Therefore, correction parameters corresponding to the main image and the sub-image, which are different from those for a 3D image, are prepared at the photographing time of the 2D image, and corrections are performed using the correction parameters. FIG. 14C illustrates the point images of the main image and the sub-image which have been corrected by the correction parameters for a 2D image, where even if these point images are added, the two-line blur does not occur.

Incidentally, as the correction parameters corresponding to the main image and the sub-image for photographing a 2D image, correction parameters approximately equal to each other can be used. Therefore, before the main image and the sub-image are added before corrections, correction can be performed by using the correction parameter for 2D image to the added images.

<Sixth Embodiment>

FIG. 15 is a flowchart illustrating a reproducing action of a stereoscopic image taking apparatus 10 of a sixth embodiment of the present invention.

First, when photographing is performed under the 2D photographing mode or the 3D photographing mode using the stereoscopic image taking apparatus 10 of the sixth embodiment, the MP file in which a 3D image has been stored or the Exif file in which a 2D image has been stored is recorded on the memory card 54, as described above. Further, the stereoscopic image taking apparatus 10 does not perform image processing such as sharpness correction to the 3D image or the 2D image at the recording time to the memory card 54.

In FIG. 15, when the mode of the stereoscopic image taking apparatus 10 is switched to the reproducing mode, the 3D image or the 2D image recorded on the memory card 54 is read out (step S70).

Subsequently, whether or not the read image is the 3D image is determined (step S72). The determination can be made from an extension indicating the MP file or the Exif file, or tag information indicating the type of an image within the MP file.

When it is determined that the image read from the memory card 54 is the 3D image, individual correction parameters corresponding to the main image and the sub-image constituting the 3D image are read from the ROM 46 (step S74), image processing to the main image and image processing to the sub-image are performed using the read individual correction parameters (step S76). Then, the corrected main image and sub-image are outputted to the liquid crystal display monitor 30, an external 3D display, an external 3D printer, or the like (step S78).

On the other hand, when it is determined that the image read from the memory card 54 is the 2D image, the correction parameter corresponding to the 2D image is read from the ROM 46 (step S80), and image processing of the 2D image is performed using the read correction parameter (step S82). Then, the corrected 2D image is outputted to the liquid crystal display monitor 30, an external 3D display, an external 3D printer, or the like (step S84).

Incidentally, the above-described sixth embodiment does not apply the image processing such as sharpness correction to the 3D image or the 2D image at the recording time to the memory card 54, but it does not limited to this, and it can apply general image processing to the 3D image or the 2D image. In this case, image processing applied to the main image and that applied to the sub-image can be different from each other so that unbalance between both the images is corrected, only when reproduction of the 3D image is performed.

<Other>

Since the optical characteristics of the photographing optical system 12 in the left direction and in the right direction vary according to the zoom position, correction parameters for correcting unbalance between the main image and the sub-image are stored and held corresponding to respective zoom positions, and in response to the zoom position (zoom magnification) at the 3D image photographing time, the correction parameter corresponding to the zoom position is used.

Further, since the characteristics of the main image and the sub-image vary according to the aperture value (opening size) of the diaphragm 14, it is desirable that correction parameters for correcting unbalance between the main image and the sub-image are stored and held corresponding to respective zoom positions and respective aperture values, and in response to the zoom position and the aperture value at the 3D image photographing time, the correction parameter corresponding to the zoom position and the aperture value is used.

Figure 16:
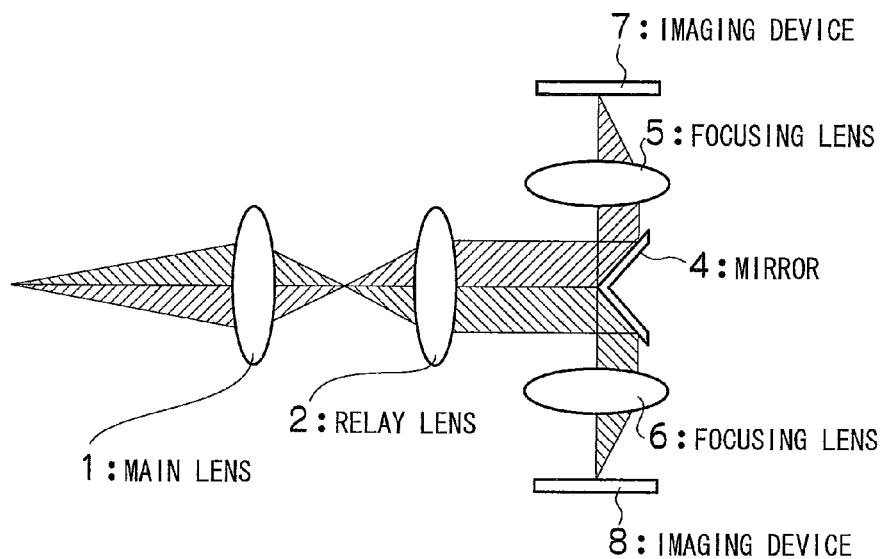
FIG. 16 is a diagram illustrating one example of an optical system of a conventional stereoscopic image taking apparatus.
Figure 17:
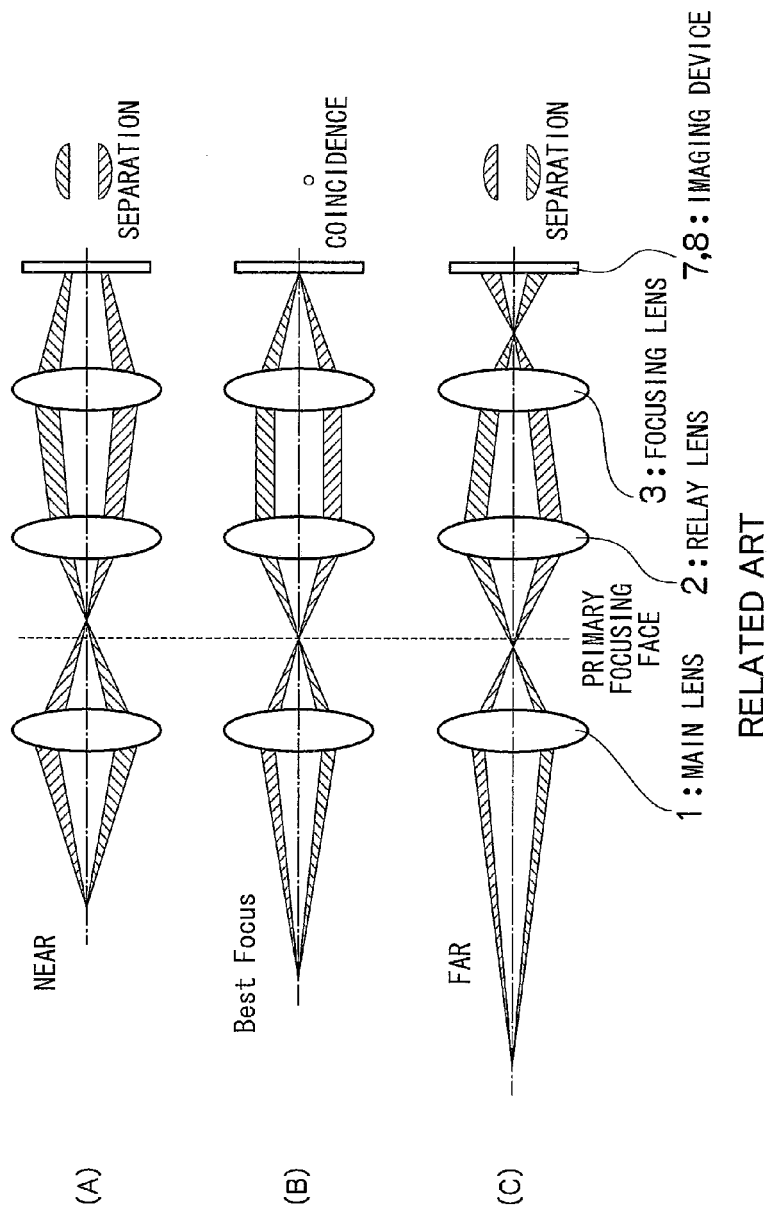
FIG. 17 is a diagram illustrating a principle where an image having a phase difference is imaged by a stereoscopic image taking apparatus.

Since, in the stereoscopic image taking apparatus 10 of this embodiment, one phase-difference CCD 16 is used, size reduction is further achieved as compared with one using two imaging devices 7 and 8 illustrated in FIG. 16, but the present invention is not limited to one using one imaging device and it can be applied to the conventional one having the optical system and imaging devices illustrated in FIG. 16.

Further, the imaging device is not limited to the CCD sensor in this embodiment, and it may be an imaging device such as a CMOS (complementary metal-oxide semiconductor) sensor.

Further, in the above embodiments, the main image and the sub-image representing the object images pupil-split in the left and right directions are obtained, but the number of object images pupil-split is not limited to two, and the directions for performing pupil-splitting are not limited to the left and right directions, therefore, pupil-splitting can be performed in left and right, and up and down directions.

Further, it goes without saying that the present invention is not limited to the above-described embodiments, and the embodiments can be modified variously without departing from the scope of the present invention.

REFERENCE SIGNS LIST

10 . . . stereoscopic image taking apparatus, 12 . . . photographing optical system, 14 . . . diaphragm, 16 . . . imaging device (phase-difference CCD), 30 . . . liquid crystal display monitor, 32 . . . CCD control unit, 34 . . . diaphragm driving unit, 36 . . . lens driving unit, 38 . . . operation unit, 40 . . . central processing unit (CPU), 42 . . . AF processing unit, 44 . . . AE detecting unit, and 46 . . . ROM.

The invention claimed is:

1. A stereoscopic image taking apparatus comprising:
a single photographing optical system;
an imaging device on which pupil-split object images which have passed through a first region and a second region of the photographing optical system, are formed, respectively, the first region and the second region being positioned differently in a predetermined direction, the imaging device configured to perform photoelectric conversions to an object image which has passed through the first region and an object image which has passed through second region to output a first image and a second image, respectively; and
an image processing unit configured to perform a first image processing to the first image and to perform a second image processing different from the first image processing to the second image, the image processing unit configured to perform the first image processing and the second image processing so as to reduce a difference in image quality between the first image and the second image which have been processed.

2. The stereoscopic image taking apparatus according to claim 1, wherein
the image processing unit performs different sharpness corrections to the first image and the second image, respectively.

3. The stereoscopic image taking apparatus according to claim 2, further comprising
a parallax amount calculating unit configured to calculate a parallax amount based upon the first image and the second image, wherein
the image processing unit reduces a degree of a sharpness correction to images whose calculated parallax amount is large.

4. The stereoscopic image taking apparatus according to claim 1, wherein
the image processing unit performs different chromatic aberration corrections to the first image and the second image, respectively.

5. The stereoscopic image taking apparatus according to claim 1, wherein
the image processing unit performs different distortion corrections to the first image and the second image, respectively.

6. The stereoscopic image taking apparatus according to claim 1, further comprising
a storage unit configured to store a first correction parameter and a second correction parameter used for an image processing of the first image and an image processing of the second image, wherein
the image processing unit performs the image processing to the first image and the image processing to the second image based upon the stored first correction parameter and the stored second correction parameter, respectively.

7. The stereoscopic image taking apparatus according to claim 6, wherein
the photographing optical system is a zoom lens,
the first correction parameter and the second correction parameter are stored in the storage unit corresponding to zoom positions of the zoom lens or corresponding to the zoom positions and aperture values, respectively, and
the image processing unit reads the first correction parameter and the second correction parameter from the storage unit based upon a zoom position, or the zoom position and an aperture value at a photographing time to perform the image processing to the first image and the image processing to the second image based upon the read first correction parameter and the read second correction parameter, respectively.

8. The stereoscopic image taking apparatus according to claim 1, further comprising
a recording unit configured to record a stereoscopic image composed of the first image and the second image which have been processed by the image processing unit in a recording medium.

9. The stereoscopic image taking apparatus according to claim 1, wherein
the image processing unit performs an image processing different from the first image processing and the second image processing at a photographing time of a flat image obtained by adding the first image and the second image.

10. The stereoscopic image taking apparatus according to claim 1, further comprising
a recording unit configured to record, in a recording medium, information representing a stereoscopic image and information representing a flat image together with the first image and the second image before being processed by the image processing unit while associating both information with each other, wherein
the image processing unit performs the first image processing and the second image processing to the first image and the second image which have been read from the recording medium at an outputting time of the stereoscopic image and performs an image processing different from the first image processing and the second image processing at an outputting time of the flat image.

11. The stereoscopic image taking apparatus according to claim 1, wherein
the imaging device includes a first group of pixels and a second group of pixels for photoelectric conversion, the pixels in each group being arranged in a matrix, the first group of pixels being restricted regarding a light receiving direction of luminous flux so as to receive only the object image which has passed through the first region of the photographing optical system, and the second group of pixels being restricted regarding the light receiving direction of the luminous flux so as to receive only the object image which has passed through the second region of the photographing optical system, and the first image and the second image being capable of being read from the first group of pixels and the second group of pixels.

* * * * *